US011468036B2

(12) United States Patent
Davis

(10) Patent No.: US 11,468,036 B2
(45) Date of Patent: Oct. 11, 2022

(54) FACILITATING DETERMINATION OF RELIABILITY OF CROWD SOURCED INFORMATION

(71) Applicant: AT&T Intellectual Property I, L.P., Atlanta, GA (US)

(72) Inventor: Braxton Davis, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 334 days.

(21) Appl. No.: 16/422,080

(22) Filed: May 24, 2019

(65) Prior Publication Data

US 2019/0278763 A1    Sep. 12, 2019

Related U.S. Application Data

(63) Continuation of application No. 14/035,320, filed on Sep. 24, 2013, now Pat. No. 10,346,389.

(51) Int. Cl.
*G06F 16/23* (2019.01)
*G01C 21/34* (2006.01)
(Continued)

(52) U.S. Cl.
CPC ..... *G06F 16/2365* (2019.01); *G01C 21/3492* (2013.01); *G01C 21/3691* (2013.01);
(Continued)

(58) Field of Classification Search
CPC .. G06F 11/08; G06F 11/0709; G06F 16/2365; G06Q 50/51; G01C 21/3492; G01C 21/3691
(Continued)

(56) References Cited

U.S. PATENT DOCUMENTS 5,270,708 A    12/1993 Kamishima
5,699,056 A    12/1997 Yoshida
(Continued)

FOREIGN PATENT DOCUMENTS

EP    2 149 853 A2    2/2010
WO    2012/109753 A1    8/2012
WO    2012/172160 A1    12/2012

OTHER PUBLICATIONS

Non-Final Office Action received for U.S. Appl. No. 14/035,320 dated Sep. 1, 2015, 81 pages.
(Continued)

*Primary Examiner* — Tony Mahmoudi
*Assistant Examiner* — Kamal K Dewan
(74) *Attorney, Agent, or Firm* — Amin, Turocy & Watson, LLP

(57) ABSTRACT

Reliability of data reports can be determined by a device that receives a number of reports from different sources. One method includes: receiving data reports from devices. The data reports are associated with an occurrence of an event. The method also includes determining reliability data representing reliability of the data reports. The reliability can be determined based on one or more different defined characteristics such as the location at which a data report was generated relative to the location of the event, whether the data report was the most recently-received data report and/or the number of data reports reporting that an event is ongoing relative to the number of data reports reporting that the event is no longer ongoing. The method can also include determining whether a data report includes information indicative of a false positive report or a false negative report.

20 Claims, 13 Drawing Sheets

(51) Int. Cl.
*G06F 11/08* (2006.01)
*G06F 11/07* (2006.01)
*G01C 21/36* (2006.01)
*G06Q 50/00* (2012.01)

(52) U.S. Cl.
CPC .......... *G06F 11/0709* (2013.01); *G06F 11/08* (2013.01); *G06Q 50/01* (2013.01)

(58) Field of Classification Search
USPC ........................................................ 707/690
See application file for complete search history.

(56) References Cited

U.S. PATENT DOCUMENTS

| | | | |
|---|---|---|---|
| 7,379,800 | B2 | 5/2008 | Breed |
| 7,804,423 | B2 | 9/2010 | Mudalige et al. |
| 8,059,012 | B2 | 9/2011 | Bai et al. |
| 8,068,016 | B2 | 11/2011 | Toh |
| 8,126,480 | B2 | 2/2012 | Morrison |
| 8,260,496 | B2 | 9/2012 | Gagliano |
| 8,427,341 | B2 | 4/2013 | Yulevich |
| 8,923,890 | B1 | 12/2014 | White et al. |
| 10,187,776 | B1* | 1/2019 | Fitzpatrick .............. H04W 4/90 |
| 2002/0115423 | A1* | 8/2002 | Hatae ..................... G08B 25/08 455/404.1 |
| 2004/0032853 | A1* | 2/2004 | D'Amico .............. H04L 1/1893 370/349 |
| 2006/0095199 | A1 | 5/2006 | Lagassey |
| 2008/0270628 | A1 | 10/2008 | Nekovee et al. |
| 2009/0258642 | A1 | 10/2009 | Golenski |
| 2010/0019932 | A1 | 1/2010 | Goodwin |
| 2010/0194592 | A1 | 8/2010 | Yim et al. |
| 2010/0299021 | A1 | 11/2010 | Jalili |
| 2011/0028122 | A1* | 2/2011 | Kota ..................... G01S 5/0054 455/404.2 |
| 2011/0202591 | A1* | 8/2011 | Reis ......................... G08G 1/20 709/203 |
| 2011/0295577 | A1 | 12/2011 | Ramachandran |
| 2012/0158668 | A1 | 6/2012 | Tu et al. |
| 2012/0290576 | A1 | 11/2012 | Amorim |
| 2013/0018705 | A1 | 1/2013 | Heath et al. |
| 2013/0041941 | A1 | 2/2013 | Tomasic et al. |
| 2013/0080197 | A1 | 3/2013 | Kung et al. |
| 2013/0144879 | A1 | 6/2013 | Kuehnel et al. |
| 2013/0252628 | A1 | 9/2013 | Kuehnel |
| 2013/0303198 | A1 | 11/2013 | Sadasivam et al. |
| 2013/0342368 | A1 | 12/2013 | Nathanson |
| 2014/0067487 | A1 | 3/2014 | Assuncao et al. |
| 2014/0067938 | A1 | 3/2014 | Boldyrev et al. |
| 2014/0164364 | A1 | 6/2014 | Cosgrove et al. |
| 2014/0214832 | A1* | 7/2014 | Nandakumar ......... G06Q 50/01 707/737 |
| 2014/0236464 | A1* | 8/2014 | Gueziec ........... G08G 1/096716 701/117 |
| 2014/0266690 | A1 | 9/2014 | Mckinley et al. |
| 2014/0266795 | A1* | 9/2014 | Tseng .................. G08G 1/0112 340/905 |
| 2014/0280231 | A1 | 9/2014 | Paruchuri et al. |
| 2016/0205238 | A1* | 7/2016 | Abramson ........... G08G 1/0137 455/456.4 |
| 2018/0049043 | A1* | 2/2018 | Hoffberg ................ G06Q 20/40 |

OTHER PUBLICATIONS

Blanco et al., "Repeatable and Reliable Search System Evaluation using Crowdsourcing", SIGIR 2011 Beijing China, Jul. 24-28, 2011, pp. 923-932.
Final Office Action received for U.S. Appl. No. 14/035,320 dated Feb. 8, 2016, 49 pages.
Non-Final Office Action received for U.S. Appl. No. 14/035,320 dated Jun. 13, 2016, 44 pages.
Final Office Action received for U.S. Appl. No. 14/035,320 dated Nov. 28, 2016, 47 pages.
Non-Final Office Action received for U.S. Appl. No. 14/035,320 dated May 12, 2017, 34 pages.
Final Office Action received for U.S. Appl. No. 14/035,320 dated Oct. 10, 2017, 39 pages.
Non-Final Office Action received for U.S. Appl. No. 14/035,320 dated Mar. 15, 2018, 22 pages.
Final Office Action received for U.S. Appl. No. 14/035,320 dated Sep. 11, 2018, 22 pages.
Cooper, Thomas, "Automobile Identification using Android", pp. 1-3.
Gordon et al., "License Plate Recognition Technology" Innovation in Law Enforcement Use; Published at FBI Law Enforcement Bulletin, Mar. 2007, 7 pages.
Hsieh et al., "A Real-time Mobile Vehicle License Plate Detection and Recognition for vehicle monitoring and management", 2009, pp. 197-202.
Smith et al., "Mobile Image Capture and Management", Proceedings of the 2004 Joint ACM/IEEE Conference on Digital Libraries, 2004, 1 page.
Wang et al., "Fast License Plate Location and Recognition Using Wavelet Transform in Android", 2011, pp. 1035-1038.
Mutholib et al., "Design and Implementation of Automatic Number Plate Recognition on Android Platform", Proceedings of International Conference on Computer and Communication Engineering, Jul. 3-5, 2012, pp. 540-543.
Guven et al., "PICASSO: Pervasive Information Chronicling, Access, Search, and Sharing for Organizations", 2005, 10 pages.

* cited by examiner

FACILITATING DETERMINATION OF RELIABILITY OF CROWD SOURCED INFORMATION

RELATED APPLICATION

The subject patent application is a continuation of, and claims priority to, U.S. patent application Ser. No. 14/035,320, filed Sep. 24, 2013, and entitled "Facilitating Determination of Reliability of Crowd Sourced Information," the entirety of which application is hereby incorporated by reference herein.

TECHNICAL FIELD

The subject disclosure relates generally to information processing, and specifically to facilitating determination of reliability of crowd sourced information.

BACKGROUND

With an increase in the ability to gather data about events in our environment, the type and speed of communication transmission over wireless channels, and the desire to respond accordingly to such events, crowd sourcing has increased and the information obtained from crowd sourcing is in demand. However, inefficiency, inconvenience and/or a compromise in safety can occur as a result of erroneous crowd sourced information.

DETAILED DESCRIPTION

Figure 1:
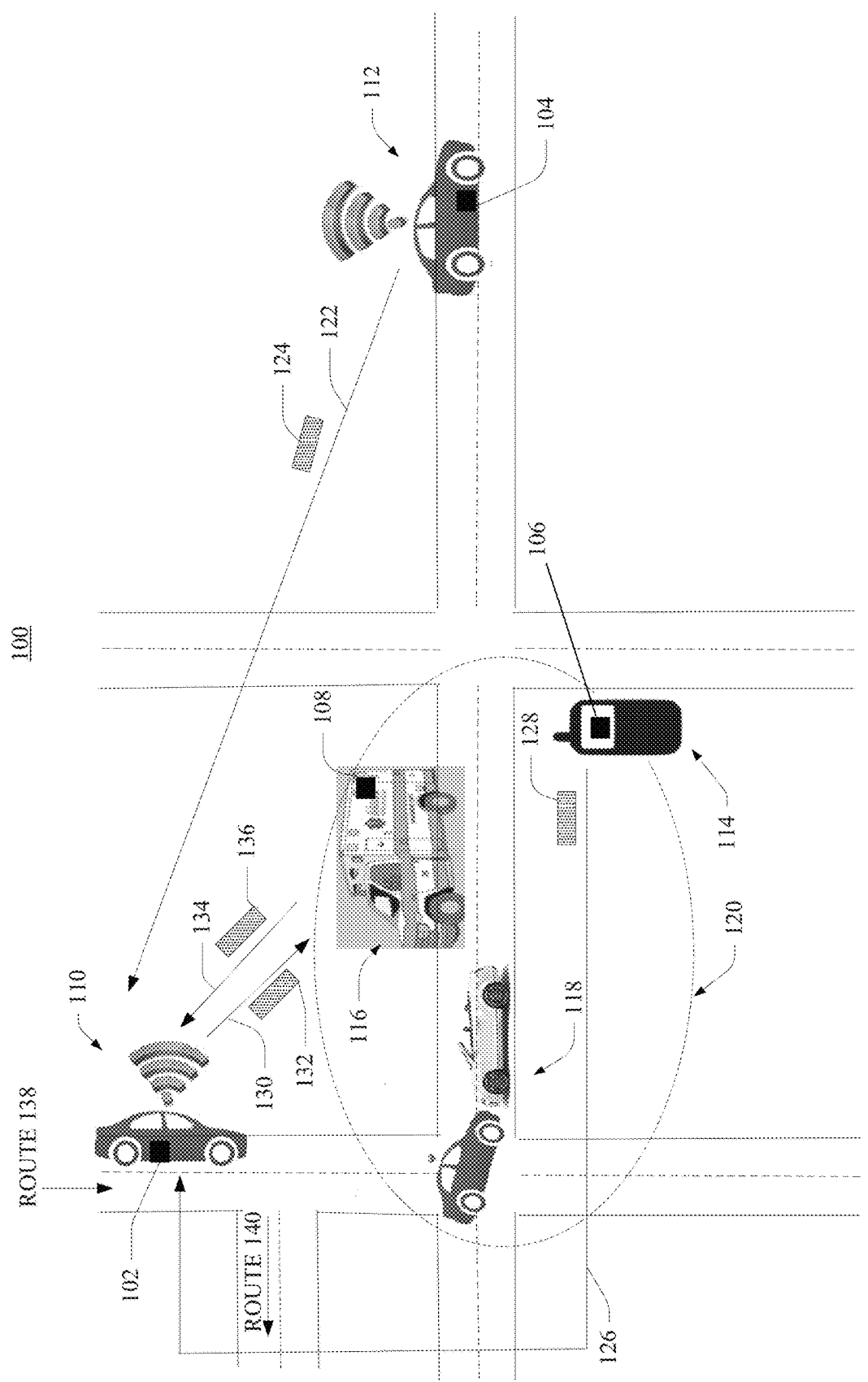
FIG. 1 illustrates an example block diagram of a system facilitating determination of reliability of crowd sourced information in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (femto cell device)," "Node B," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "mobile device," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the term "femto" and "femto cell" are used interchangeably, and the terms "macro" and "macro cell" are used interchangeably.

Crowd sourced information has increased and continues to be on the rise due to efficiencies to be gained through the use of such information. As used herein, the term "crowd sourced information" means information gathered from more than one source about an event. As used herein, an "event" includes, but is not limited to, a weather-related event (e.g., tornado, snow storm, earthquake), a traffic-related event (e.g., heavy traffic congestion, construction, bridge out, road detours), a security- or fire- or other emergency-related event (e.g., burglary or fire at home or commercial residence, national or state security events, evacuations, public crime events), a vehicular accident, a business- or financial-related event (e.g., stock market performance, retail store sales) or the like.

Crowd sourced information can be utilized to inform users or systems located in a first geographic location of events in a second geographic location, wherein the second geographic location is distinct from the first location. Based on the crowd sourced information, users and/or devices that receive the information can alter subsequent actions to avoid unsafe conditions or conditions that would result in severe delay or other inconvenience.

Accordingly, mitigation of false positives and false negatives becomes increasingly important to improve reliability of the information. In particular, because crowd sourced information can originate from numerous different devices reporting information associated with a single event, when distribution and corresponding receipt of information ceases or slows, an inference may be made at the receiving device that the event has ceased to occur or is no longer of interest or importance. However, in some cases, the event is still ongoing or of interest but erroneous crowd sourced data may have reported the event to have ceased and, as a result, other devices may cease monitoring for the event. In another scenario, such as an automobile accident, numerous devices may report the accident and, as a result, devices receiving the report may take alternate routes to avoid the accident. As a result, the number of devices taking a route along with the accident, and therefore reporting the accident, may diminish significantly. As such, fewer devices may be available to provide a current report as to whether the event is ongoing (e.g., cars still in place on the street) or whether the event has ceased/is no longer ongoing. Thus, the receiving device may not be informed when the accident has cleared. As yet another example, initial reports regarding security breach (e.g., burglary) or fire at a home or business residence may be provided. However, updated information as to whether the security breach/fire is ongoing or whether the event has ended may not be provided by the alarm system initially providing the report.

Based on the foregoing, systems, methods, apparatus and/or computer-readable storage media described herein facilitate determination of the reliability of crowd sourced information. In one embodiment, a method includes: receiving, by a device comprising a processor, data reports respectively from devices, wherein the data reports are associated with an occurrence of an event; and determining, by the device, reliability data representing a reliability of the data reports.

In another embodiment, an apparatus includes: a memory to store executable instructions; and a processor, coupled to the memory, that facilitates execution of the executable instructions to perform operations. The operations can include: receiving data reports respectively from devices, wherein the data reports are associated with an occurrence of an event; and determining a reliability of a data report of the data reports based on a defined characteristic of the data reports.

In yet another embodiment, a computer-readable storage medium storing computer-executable instructions that, in response to execution, cause a device comprising a processor to perform operations. The operations can include: receiving data reports respectively from devices, wherein the data reports are associated with an occurrence of an event; and selecting, as accurate, a data report of the data reports, wherein the selecting is based on a defined characteristic of the data report.

One or more embodiments can advantageously improve the determination of reliability of crowd sourced information and/or aid in determination of whether data reports received represent false positive information or false negative information.

Turning now to the drawings, FIG. 1 illustrates an example block diagram of a system facilitating determination of reliability of crowd sourced information in accordance with one or more embodiments described herein. System 100 can include one or more devices 102, 104, 106, 108 electrically and/or communicatively coupled to one or more respective subsystems 110, 112, 114, 116. While devices 102, 104, 106, 108 are shown electrically and/or communicatively coupled to subsystems 110, 112, 114, 116, in some embodiments, devices 102, 104, 106, 108 can be stand-alone, self-powered devices that are not electrically coupled to subsystems 110, 112, 114, 116. For example, in some embodiments, devices 102, 104, 106, 108 can be stand-alone devices affixed to architectural or roadway structures (e.g., buildings, bridges, overpasses, street signs, road pavement).

Devices 102, 104, 106, 108 can be any devices, including software, hardware or a combination of hardware and software, configured to identify one or more events, transmit information about one or more identified events, receive crowd sourced information from one or more devices about one or more events and/or determine reliability of received crowd sourced information.

In various embodiments, subsystems 110, 112, 114, 116 can be any number of different components including, but not limited to, a bicycle, motorcycle, conventional automobile, connected car (e.g., subsystems 110, 112), emergency vehicle (e.g., subsystem 116) and/or a mobile device (e.g., subsystem 114). A "connected car" can mean a vehicle configured to access a network (e.g., internet or otherwise), one or more other connected cars, or other devices configured to transmit and/or receive information including, but not limited to, home or business alarm or fire systems, an emergency vehicle and/or a mobile device (e.g., smart phone, personal digital assistant (PDA), laptop). In various embodiments, subsystems 110, 112, 114, 116 can be devices associated with or used for navigation (e.g., boats, ships), video (e.g., cameras), sound and/or networks. Different types of subsystems can communicate with one another utilizing embodiments described herein. Accordingly, embodiments described herein can be employed in a vast array of industries including, but not limited to, the automobile industry (e.g., connected car manufacturers, manufacturers of connected car systems), telecommunication industry (e.g., mobile telephone manufacturers), information technology and/or data processing industry (e.g., data providers) and/or public safety industry (e.g., emergency vehicles, emergency systems).

While subsystems 110, 112, 114, 116 are mobile, in various embodiments, subsystems electrically and/or communicatively coupled to devices 102, 104, 106, 108 can be mobile or stationary. Examples of stationary subsystems can include, but are not limited to, street lights, street cameras, light poles or the like. In various embodiments, devices 102, 104, 106, 108 and/or subsystems 110, 112, 114, 116 can record visual or other information indicative of one or more different street views. The different street views from numerous devices can be combined to update online street view services in some embodiments.

As shown in FIG. 1, in one embodiment, devices 112, 114 are within geographic proximity to event 118 and generate data reports descriptive of event 118. In the embodiment shown, event 118 is an automobile accident at which emergency vehicle 116 (e.g., ambulance) electrically and/or communicatively coupled to device 108 is located. However, in other embodiments, event 118 can be any number of other types of accidents including, but not limited to, other roadway conditions/events (e.g., festivals, parades, police radar activity, potholes, erratic driving behavior, construction), weather (e.g., black ice, flooding, sun glare, winter weather conditions) or the like. While the emergency vehicle shown in FIG. 1 is an ambulance, different emergency vehicles can include device 108. For example, emergency vehicles electrically and/or communicatively coupled to device 108 can include, but are not limited to, police cars, helicopters (not shown), motorcycles, fire trucks, military equipment or the like.

The data report can indicate a type or location of event 118 and/or whether event 118 is ongoing or no longer ongoing. For example, a data report can include information indicating that event 118 is ongoing (e.g., two-automobile accident with cars in road) at a particular intersection at a particular time.

As shown, device 112 can generate and/or transmit data report 124 to device 102 over wireless channel 122 noting the occurrence of event 118 while device 114 can generate and/or transmit data report 128 to device 102 over wireless channel 126. Wireless channels 122, 126 (and the wireless channels described herein) can be any number of different types of wireless channels operating according to different protocols and/or associated with different portions of spectrum including, but not limited to, those associated with Wi-Fi, UMTS, LTE or other protocols, for example. In some embodiments, wireless channels described herein can be associated with protocols and/or dedicated spectrum for emergency communications (e.g., E-911 communication).

Upon receiving one or more of data reports 124, 128, device 102 can determine reliability of crowd sourced information included in data reports 124, 128. In various embodiments, determining reliability can include, but is not limited to, determining whether a data report includes a report that is a false positive (e.g., reporting occurrence of an event that has not occurred or that is no longer occurring), determining whether a data report includes a report that is a false negative (e.g., reporting that an event has ceased to occur if the event is still occurring), deleting or otherwise ignoring a false positive report or a false negative report and/or selecting one or more data reports as accurate from a set of received data reports from one or more devices.

For example, device 102 can determine whether event 118 is ongoing or whether the event has ended (e.g., the accident has been moved out of traffic). In some embodiments, determination of whether event 118 is ongoing or whether event 118 has ended can include determining whether either or both of data reports 124, 128 include a data report that is a false positive (e.g., event 118 no longer occurring although the data report reported event 118 as occurring) or a false negative (e.g., event 118 occurring although the data report reported event 118 as no longer occurring).

In various embodiments, device 102 can determine reliability of data reports 124, 128 in a number of different ways. For example, in one embodiment, device 102 can aggregate data reports 124, 128 and select as an accurate data report the data reported generated later in time. For example, if device 104 generated data report 124 at 1:05 p.m. EDT while device 114 generated data report 128 at 1:10 p.m. EDT, device 102 can select data report 128 as the accurate data report (or determine that the information included in data report 128 is accurate and/or reliable and/or preferred over one or more other data reports).

In another embodiment, device 102 can determine the reliability of data reports 124, 128, 136 by comparing data reports 124, 128, 136 and selecting as the accurate data report the type of data report that is greatest in number. For example, numerous devices (e.g., device 114, 116, 112) can generate and transmit data reports (e.g., data reports 106, 108, 104) about event 118. By way of example, but not limitation, data report 124 can include information indicating that event 118 is no longer ongoing while data reports 128, 136 can include information indicating that event 118 is ongoing. Device 102 can aggregate the data reports such that data report 124 is in a first category and data reports 128, 136 are in a second category. Since the second category includes more data reports than the first category, device 102 can select the information indicated in the second category as accurate and/or select one or more of data reports 128, 136 as accurate data reports (or determine that the information included in data reports 128, 136 is accurate and/or reliable and/or preferred over one or more other data reports).

As another example, device 102 can aggregate any number of data reports and compute an average value to determine whether the event is ongoing or no longer ongoing. For example, a first value can be assigned to each data report that includes information indicative of the event ongoing, and a second value can be assigned to each data report that includes information indicative of the event no longer ongoing. Device 102 can take an average, and device 102 can make a decision as to whether the event is ongoing or no longer ongoing based on the average value relative to a defined value.

In another embodiment, device 102 can determine the reliability of data reports 124, 128 by aggregating data reports 124, 128 and selecting as accurate a data report generated by a device that is currently closest to event 118 (or that was closest to event 118 when the data report was generated). For example, if device 104 was 0.01 miles from event 118 when data report 124 was generated, and device 106 was 0.05 miles from event 118 when data report 124 was generated, device 102 can select data report 124 as the accurate data report (or determine that the information included in data report 124 is accurate and/or reliable and/or preferred over one or more other data reports).

In another embodiment, device 102 can determine the reliability of data reports 124, 128 by selecting, as accurate, a data report generated by a device that is located at a geographic location within a defined distance to event 118 (e.g., within geographic location 120), or that was within the defined distance to event 118 when the data report received from the device was generated). For example, if device 104 is outside of geographic location 120 (or was outside geographic location 120 when data report 124 was generated) and device 106 is inside geographic location 120 (or was inside geographic location 120 when data report 128 was generated), device 102 can select data report 128 as the accurate data report (or determine that the information included in data report 128 is accurate and/or reliable and/or preferred over one or more other data reports).

In another embodiment, device 102 can determine the reliability of data reports 124, 128 by transmitting information 132 over wireless channel 130 to an emergency vehicle (e.g., device 108) assisting with, or located within a defined distance to, event 118. Information 132 can cause device 108 to transmit data report 136 over wireless channel 134 to device 102. For example, in some embodiments, information 132 can include a request for information about event 118. Accordingly, one or more embodiments described herein can facilitate keeping information flowing to recipient devices (e.g., device 102) so that device 102 can make an accurate decision as to whether event 118 continues to occur or has ceased to occur. If there is some communication from some known presence due to the nature of the event (e.g., emergency vehicle when accident, helicopter when accident), device 102 can utilize the presence of such device to obtain reliable information.

Further, in some embodiments, device 102 can determine that a data report is accurate if the data report originates from a vehicle having a defined level of trust (e.g., emergency vehicle). Accordingly, device 102 can determine that the information included in data report 136 is accurate and/or reliable and/or preferred over one or more other data reports.

In another embodiment, device 102 can determine the reliability of one or more of data reports 124, 128 by evaluating a function characterizing the likelihood that a particular type of event is ongoing over time. In some embodiments, the function can be characterized in a look-up table that associates a likelihood value with an amount of time after an event has commenced. For example, for an automobile accident involving two cars, the likelihood that the accident continues to be ongoing can be 0.5 ten minutes after the accident occurs and 0.10 30 minutes after the accident occurs. However, for an automobile accident involving a car and a truck, the likelihood that the accident is ongoing can be 0.9 ten minutes after the accident occurs and 0.5 30 minutes after the accident occurs. As shown, the function can differ based on the type of event and can be updated from time to time based on whether a data report generated a defined amount of time after an event commenced was discovered by device 102 to include false positive information or false negative information.

As subsystem 110, which is coupled to device 102, is traveling along route 138, in some embodiments, for example, if device 102 determines that event 118 is ongoing (and will therefore prevent subsystem 110 from driving along route 138 at the intersection at which event 118 is located), device 102 can communicate such information to subsystem 110. As a result, subsystem 110 can take a detour via route 140. By contrast, if device 102 determines that event 118 is no longer ongoing, device 102 can communicate such information to subsystem 110. As a result, subsystem 110 can continue driving along route 138 (or device 102 can provide no communication with subsystem 110 and the subsystem 110 can continue driving along route 138 by default).

Figure 2:
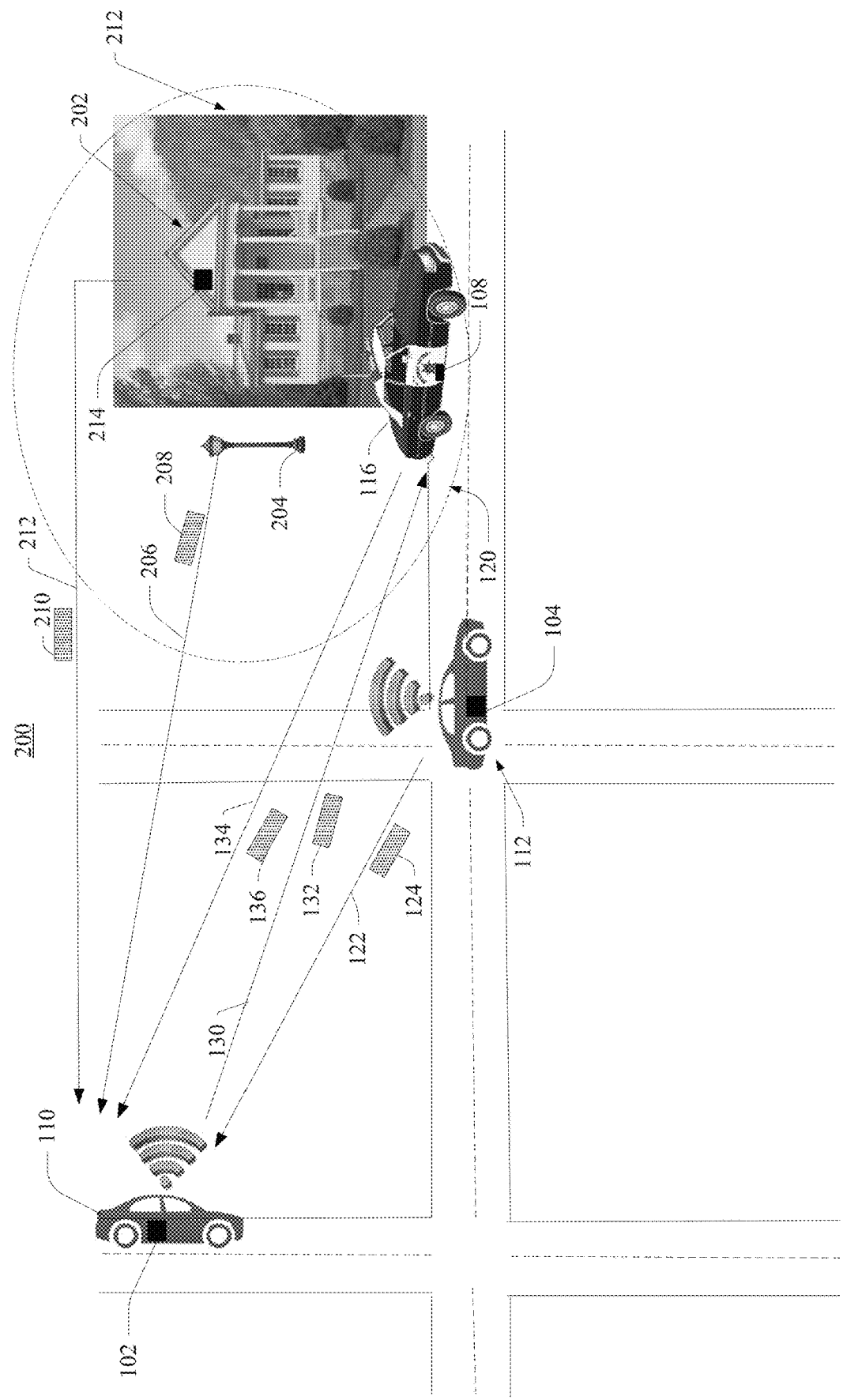
FIG. 2 illustrates an example block diagram of another system facilitating determination of reliability of crowd sourced information in accordance with one or more embodiments described herein.

Turning now to FIG. 2, while FIG. 1 illustrated an automobile accident as event 118, FIG. 2 illustrates a security breach as event 212. Devices herein can determine reliability of crowd sourced information in any number of different environments. Repetitive description of like elements employed in respective embodiments of systems and/or apparatus described herein are omitted for sake of brevity.

FIG. 2 includes devices 102, 104, 214, 108. Device 214 can include the structure and/or functionality of one or more of devices 102, 104, 106, 108 in various embodiments. As shown, device 214 can be electrically and/or communicatively coupled to subsystem 202 (e.g., residential property alarm system). Although not shown, subsystem 204 (e.g., light pole in close proximity to subsystem 202) can also include a device such as device 102, 104, 214, 108.

In this embodiment, device 202 can receive data reports 208, 124, 210. For example, in some embodiments, subsystem 202 can generate and transmit a data report including information descriptive of the type of the alarm event at subsystem 202. Device 102 can determine the reliability of the received information via one or more approaches described with reference to FIG. 1.

For example, in one embodiment, device 214 can transmit to device 102 data report 210 via wireless channel 212 regarding a fire or burglary identified by subsystem 202. Subsystem 116 (e.g., police car emergency vehicle) can arrive and investigate and transmit data report 136 over wireless channel 134 to device 102. In some embodiments, device 102 can receive data report 136 from subsystem 116 in response to information 132 communicated over wireless channel 130 to subsystem 116 requesting or otherwise causing data report 136 to be transmitted from subsystem 116.

Figure 3:
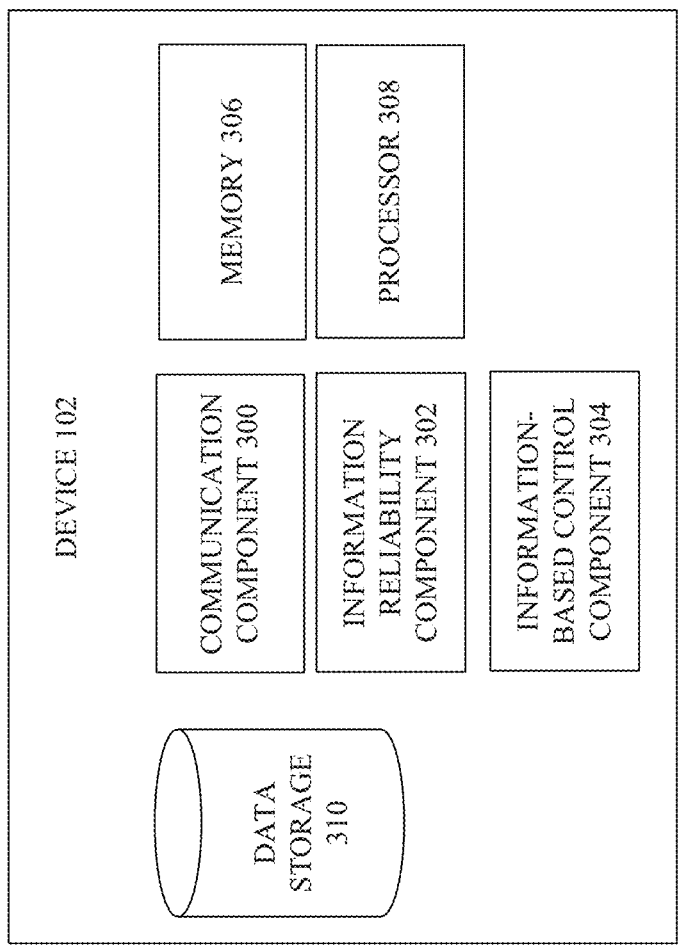
FIG. 3 illustrates an example block diagram of a device that can facilitate determination of reliability of crowd sourced information in accordance with one or more embodiments described herein.
Figure 4:
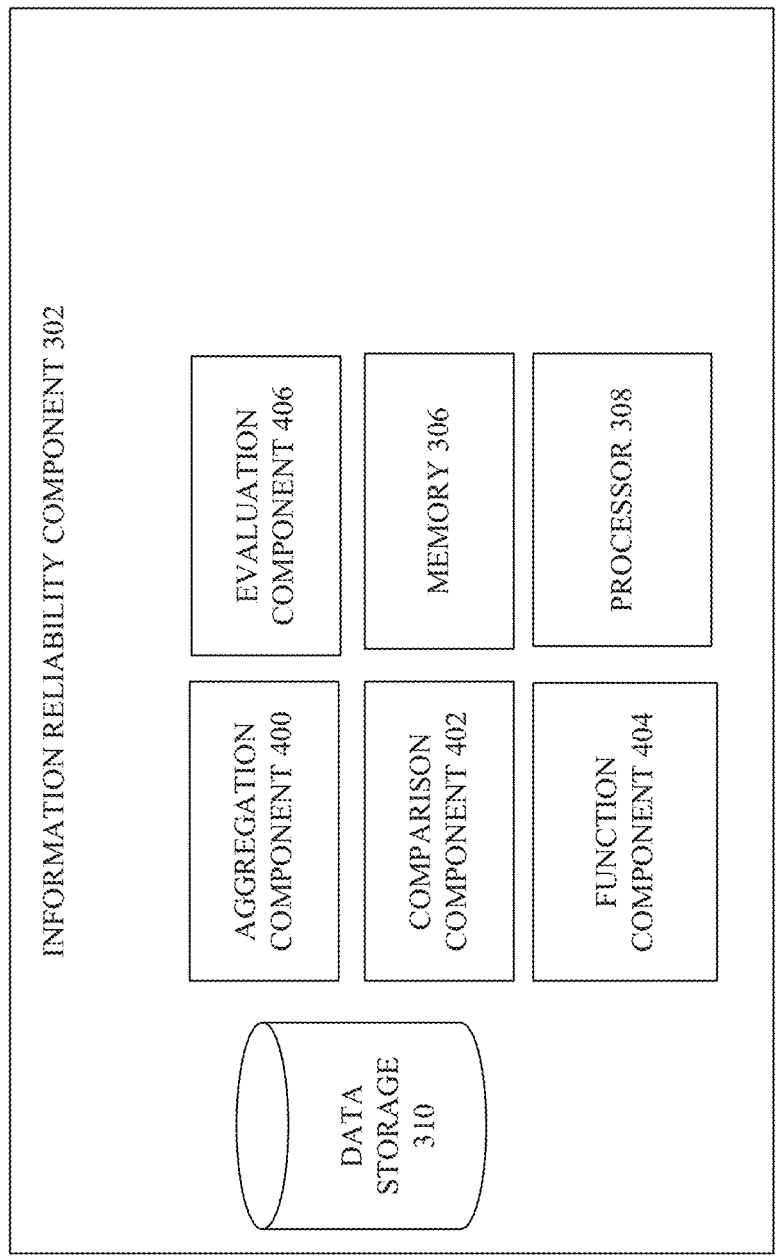
FIG. 4 illustrates an example block diagram of an information reliability component of the device of FIG. 3 in accordance with one or more embodiments described herein.

The structure and/or functionality of device 102 can be further described with reference to FIGS. 3 and 4. Device 102 can include communication component 300, information reliability component 302, information-based control component 304, memory 306, processor 308 and/or data storage 310. In various embodiments, one or more of communication component 300, information reliability component 302, information-based control component 304, memory 306, processor 308 and/or data storage 310 can be electrically and/or communicatively coupled to one another to perform one or more functions of device 102.

Communication component 200 can transmit and/or receive information to and/or from device 102. For example, in various embodiments, communication component 200 can transmit and/or receive any of a number of different types of information including, but not limited to, images, voice, video, text, data or the like. In various embodiments, the information transmitted and/or received can be a data report generated and transmitted by one or more of devices 104, 106, 108.

Information reliability component 302 can be configured to determine the reliability of one or more data reports received at device 102. Information reliability component 302 can perform one or more methods as described with reference to FIG. 1 and/or as described with reference to the structure of FIG. 4. Turning now to FIG. 4, shown is an example block diagram of information reliability component 302 of device 102.

Information reliability component 302 can include aggregation component 400, comparison component 402, function component 404, evaluation component 406, memory 306, processor 308 and/or data storage 310. In various embodiments, aggregation component 400, comparison component 402, function component 404, evaluation component 406, memory 306, processor 308 and/or data storage 310 can be electrically or communicatively coupled to perform one or more functions of information reliability component 302. Repetitive description of like elements employed in respective embodiments of systems and/or apparatus described herein are omitted for sake of brevity.

Aggregation component 400 can aggregate, average, rank and/or categorize information included in the one or more data reports and/or one or more values associated with the one or more data reports. By way of example, but not limitation, aggregation component 400 can aggregate, average, rank and/or categorize data reports in order in which the data reports are received by device 102, in order in which the data reports were generated at respective sending devices, in order of distance between the event and the sending device at the time of the data report was generated, whether the data report indicates that an event is occurring or whether the data report indicates that an event is no longer occurring.

In some embodiments, aggregation component 400 can select a data report having one or more defined characteristics. For example, aggregation component 400 can select data reports generated within a defined amount of time after the event occurred and/or data reports generated within a defined distance from the event.

Evaluation component 406 can receive information from aggregation component 400 indicative of the aggregated, averaged, ranked and/or categorized data reports. Evaluation component 406 can determine whether any or all of the aggregated data reports are reliable and/or accurate based on one or more defined criterion. For example, in some embodiments, evaluation component 406 can identify a data report as accurate or reliable based on a determination that the data report originated from a device within a defined distance from the event. As another example, evaluation component 406 can identify a data report as accurate or reliable based on a determination that the data report originated from a device having a defined level of trust (e.g., police car, ambulance, fire truck, military vehicle).

Comparison component 402 can compare one or more characteristics of data reports received at device 102 and output information indicative of the result of the comparison. Evaluation component 406 can determine reliability of one or more of the data reports based on the information output by comparison component 402. For example, comparison component 402 can determine a first number indicative of the number of data reports associated with a first type of report, and determine a second number indicative of the number of data reports associated with a second type of report. The first type of report can be a report that a particular event is ongoing, and the second type of report can be a report that the event is no longer ongoing.

Comparison component 402 can output information to evaluation component 406 indicative of the number of data reports associated with the first type of report and/or indicative of the number of data reports associated with the second type of report. In some embodiments, evaluation component 406 can determine whether there is more of the first type of reports or more of the second type of reports. Evaluation component can select as accurate the type of report (or the information included in the type of the report) that is greater in number. For example, if there is more of the first type of reports than of the second type of reports, evaluation component 406 can select, as accurate, a data report associated with the first type of report. By contrast, if there is more of the second type of reports than the first type of reports, evaluation component 406 can select, as accurate, a data report associated with the second type of report.

In some embodiments, evaluation component 406 need not select a data report; rather, evaluation component 406 can determine that an event is ongoing or no longer ongoing based on whether the first type of reports is greater in number (or fewer in number) than the second type of reports. For example, if first type of reports is greater in number than second type of report, evaluation component 406 can determine that an event is ongoing. By contrast, if the first type of reports is fewer in number than the second type of report, evaluation component 406 can determine that an event is no longer ongoing.

Function component 404 can determine, compute and/or access a function indicative of likelihood that a defined type of event is ongoing after a defined amount of time has elapsed since the event commenced. The function can differ according to the event. For example, a function for an accident between two cars can differ from the function for an accident between a car and a truck. In some embodiments, the function can take into account other factors including, but not limited to, a time of day of the event and/or a location of the event (e.g., a two-car accident in downtown Atlanta may have a different function from a two-car accident in the suburbs of Atlanta).

In some embodiments, in lieu of determining, computing and/or accessing a function, function component 404 can determine, compute and/or access a look-up table stored at device 102 or accessible by device 102 (e.g., accessible over a wireless channel to which communication component 300 of device 102 is communicatively coupled). The look-up table can include likelihood that a particular type of event is ongoing after a defined amount of time, and can also include defined amounts of time corresponding to the likelihood. Function component 404 can output information to evaluation component 406 indicative of a likelihood that a particular type of event is ongoing or is no longer ongoing.

Evaluation component 406 can receive the information from function component 404 and identify a data report as accurate or reliable or preferred based on whether the data report includes information that indicates an expected result. The expected result can be determined based on information output from function component 404. For example, evaluation component 406 can identify a data report as accurate based on a determination that there is a likelihood greater than a defined value (e.g., greater than 0.5) that an event is ongoing, and the data report reports the event as ongoing. Similarly, evaluation component 406 can identify a data report as accurate based on a determination that there is likelihood greater than a defined value (e.g., greater than 0.5) that an event is no longer ongoing, and the data report reports the event is no longer ongoing. The defined value for the likelihood that an event is ongoing or no longer ongoing can vary by the type of event and can change from time to time as described with reference to FIG. 1.

In various embodiments, in lieu of or in addition to selecting a data report as accurate, evaluation component 406 can determine that an event is ongoing or no longer ongoing based on the evaluation performed and/or based on receipt of information from aggregation component 400, comparison component 402, function component 406 and/or information reliability component 302, generally.

In some embodiments, evaluation component can determine whether a data report reports includes information indicative of a false negative or a false positive. For example, evaluation component 406 can determine that a data report reports that an event is ongoing although evaluation component 406 makes a determination that the event is no longer ongoing. As such, evaluation component 406 can determine that the data report reports a false positive. By contrast, a data report can report that an event is no longer ongoing although evaluation component 406 makes a determination that the event is ongoing. As such, evaluation component 406 can determine that the data report reports a false negative.

In various embodiments, evaluation component 406 or information reliability component 302 can store and/or access information about false negatives or false positives and/or devices from which false negatives or false positives have been received. For example, the information can be stored at, or accessible over a wireless channel by, device 102. In these embodiments, evaluation component 406 can employ the information about false negatives and false positives (and/or devices from which the information originated) in future determinations as to whether an event is ongoing, is no longer ongoing, is likely to be a false positive or a false negative based on a presumed reliability of a device from which the data report is received (based on past reliability/false positive/false negative aspects of data reports from the device).

In some embodiments, evaluation component 406 can determine reliability of one or more data reports based on a defined level of trust associated with the device that generated the data report. For example, an emergency vehicle can have a higher level of trust than a level of trust associated with a conventional vehicle. Accordingly, evaluation component 406 can select a data report from an emergency vehicle as an accurate, reliable and/or preferred data report relative to a data report from a conventional vehicle.

Turning back to FIG. 3, information-based control component 304 can be configured to output a signal to a subsystem to cause the subsystem to take action. The signal output from the information-based control component 304 can be a result of processing performed by information reliability component 302 and/or evaluation component 406. For example, in embodiments in which device 102 is electrically coupled to subsystem 110, which is a connected car (as shown in FIG. 1), information-based control component 304 can output a signal to cause subsystem 110 to take a detour (e.g., to avoid congestion from event 118) if information reliability component 302 determines that a data report received indicating that event 118 is ongoing is accurate, reliable and/or preferred over other data reports received by device 102.

Memory 306 can be a computer-readable storage medium storing computer-executable instructions and/or information for performing the functions described herein with reference to device 102, information reliability component 302 (or any component of device 102 or information reliability component 302). For example, memory 306 can store computer-executable instructions that can be executed by processor 308 to perform communication, evaluation, decision-making or other types of functions executed by device 102. Processor 308 can perform one or more of the functions described herein with reference to device 102 (or any component thereof, including information reliability component 302). For example, processor 308 can evaluate data reports received from two or more sources and determine whether one or more of the data reports are a false positive report or a false negative report. As another example, processor 308 can perform various functions to determine the reliability of data reports including, but not limited to, aggregation of information in the data reports, selection of a data report as an accurate data report or the like. Any number of different functions described herein for determining the reliability of a data report can be performed by processor 308.

Figure 5:
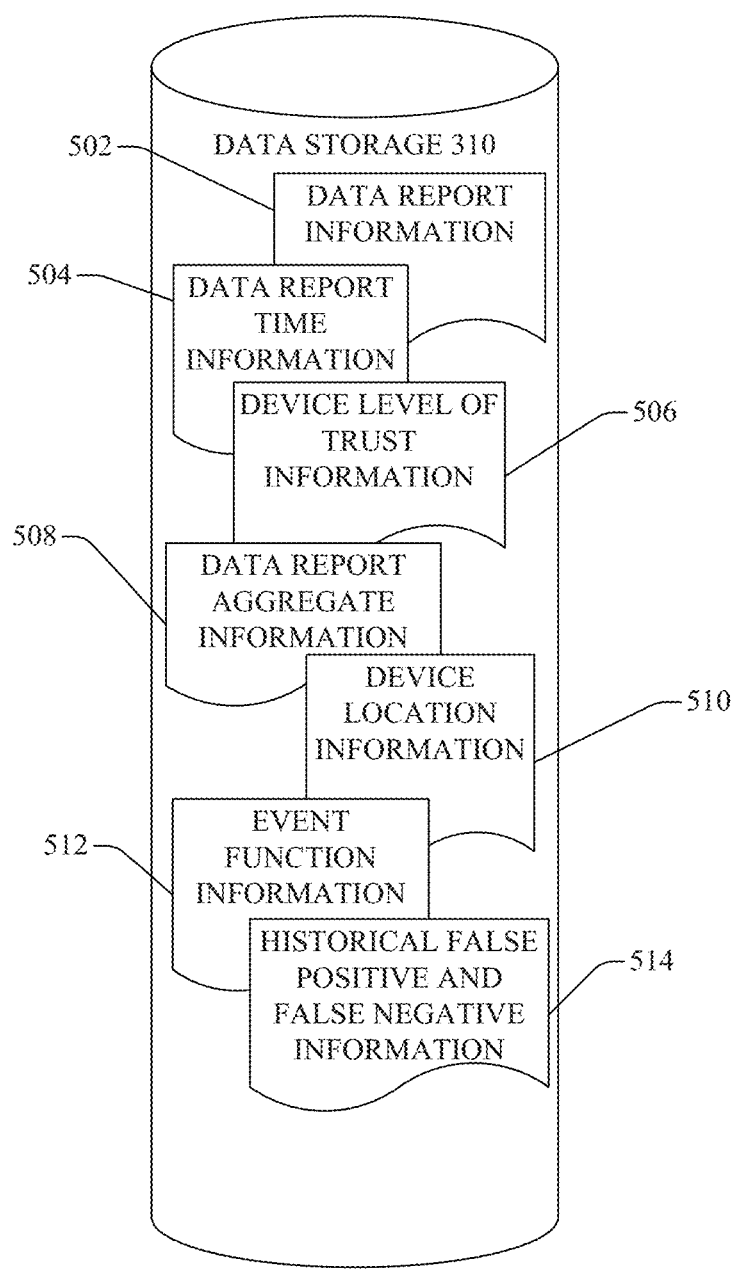
FIG. 5 illustrates an example block diagram of data storage of the device of FIG. 3 in accordance with one or more embodiments described herein.

Data storage 310 can be described in greater detail with reference to FIG. 5. FIG. 5 illustrates an example block diagram of data storage of the device of FIG. 3 in accordance with one or more embodiments described herein. As shown, data storage 310 can be configured to store information accessed by, received by and/or processed by device 102 and/or information reliability component 302. For example, data storage 310 can store data report information 502 such as information indicative of data reports received from one or more devices. For example, crowd sourced information can be stored as data report information 502. In various embodiments, data report information 502 can include, but is not limited to, information indicative of a report of the occurrence of an event, information indicative of a report that an event is ongoing, is no longer ongoing and/or details regarding an event (e.g., type of event, time of event, location of event).

As another example, data storage 310 can store data report time information 504 such as information indicative of a time of receipt of a data report at device 102 and/or information indicative of a time associated with generation of a data report.

As another example, data storage 310 can store device level of trust information 506 such as identifying information for one or more devices from which information can be or has been received and corresponding information associated with a level of trust of the device. For example, emergency vehicles (e.g., police department vehicles, fire department vehicles, ambulances) can be associated with a higher level of trust than the level of trust for conventional vehicles.

As another example, data storage 310 can store data report aggregate information 508 such as aggregating a first type of information associated with an event and aggregating a second type of information associated with a second event. In some embodiments, aggregate information 508 can include information categorized, ordered or ranked according to one or more characteristics of data reports. For example, the data reports can be ordered based on time of receipt at device 102, based on time of generation of the data reports or the like.

As another example, data storage 310 can store device location information 510 such as geographical information identifying a location of a device at a time that a report was generated and/or identifying the current or past location of the device. In some embodiments, the device location information 510 can store information indicative of the device relative to the event that the device is reporting.

As another example, data storage 310 can store event function information 512 such as a set of information indicative of a function describing the likelihood that an event is ongoing or is no longer ongoing relative to the time that has passed since the event commenced.

As another example, data storage 310 can store historical false positive and false negative information 514 such as information identifying devices that have previously provided false positive or false negative reports, information determined to be a false negative or false positive report and/or time for the information that was determined to be a false negative or false positive report. In some embodiments, a data report reporting that an event was no longer ongoing five minutes after the event commenced was determined to be a false negative report, this information can be provided as feedback to function component 404 to adjust the function for greater reliability in estimated likelihood that the event is no longer ongoing after five minutes.

Figure 6:
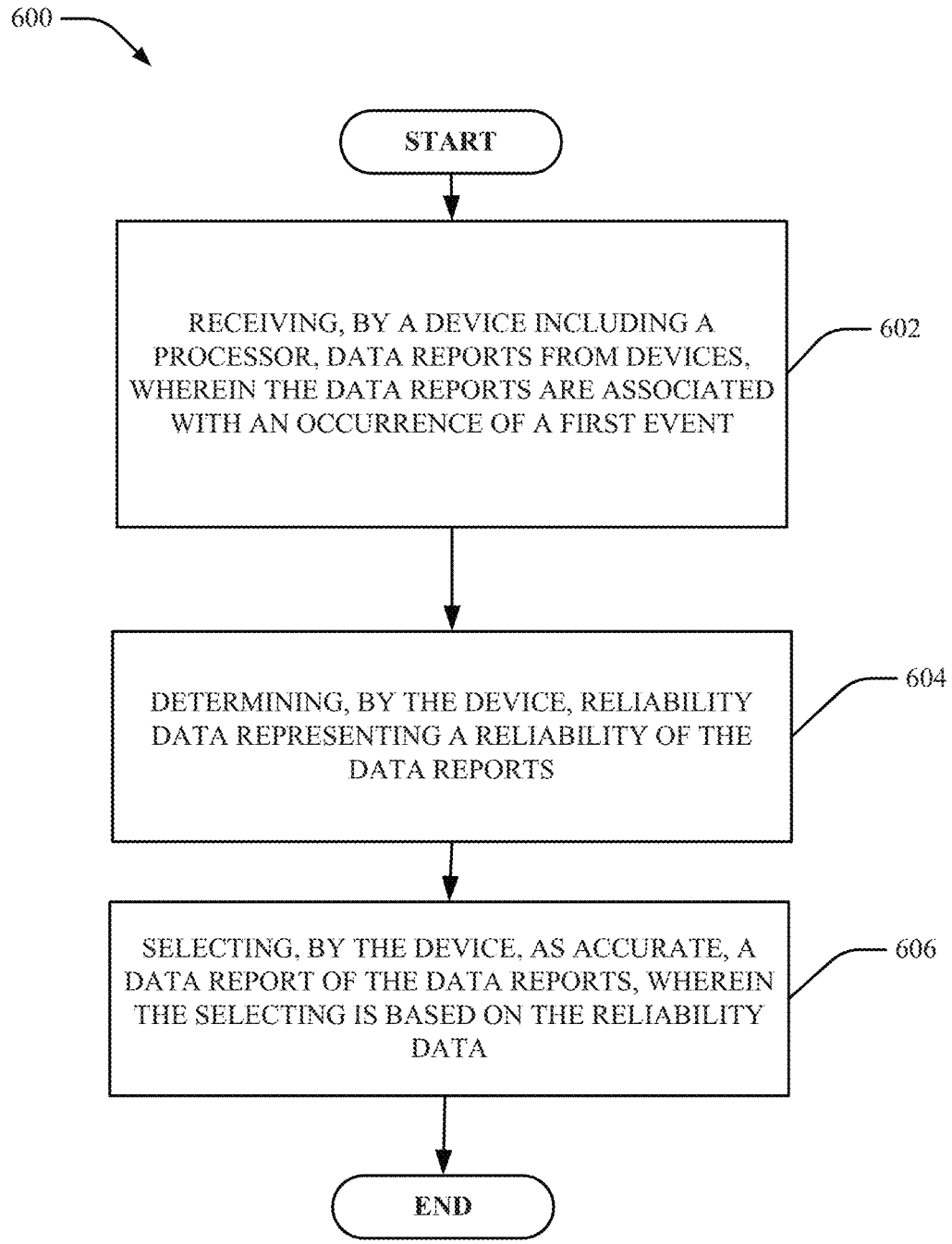
FIGS. 6-12 illustrate example flowcharts of methods that facilitate determination of reliability of crowd sourced information in accordance with one or more embodiments described herein.

FIGS. 6-12 illustrate example flowcharts of methods that facilitate determination of reliability of crowd sourced information in accordance with embodiments described herein. Turning first to FIG. 6, at 602, method 600 can include receiving, by the device including a processor, data reports from devices, wherein the data reports are associated with an occurrence of an event. At 604, method 600 can include determining, by the device, reliability data representing a reliability of the data reports. At 606, method 600 can include selecting, by the device, as accurate, a data report of the data reports, wherein the selecting is based on the reliability data.

Figure 7:
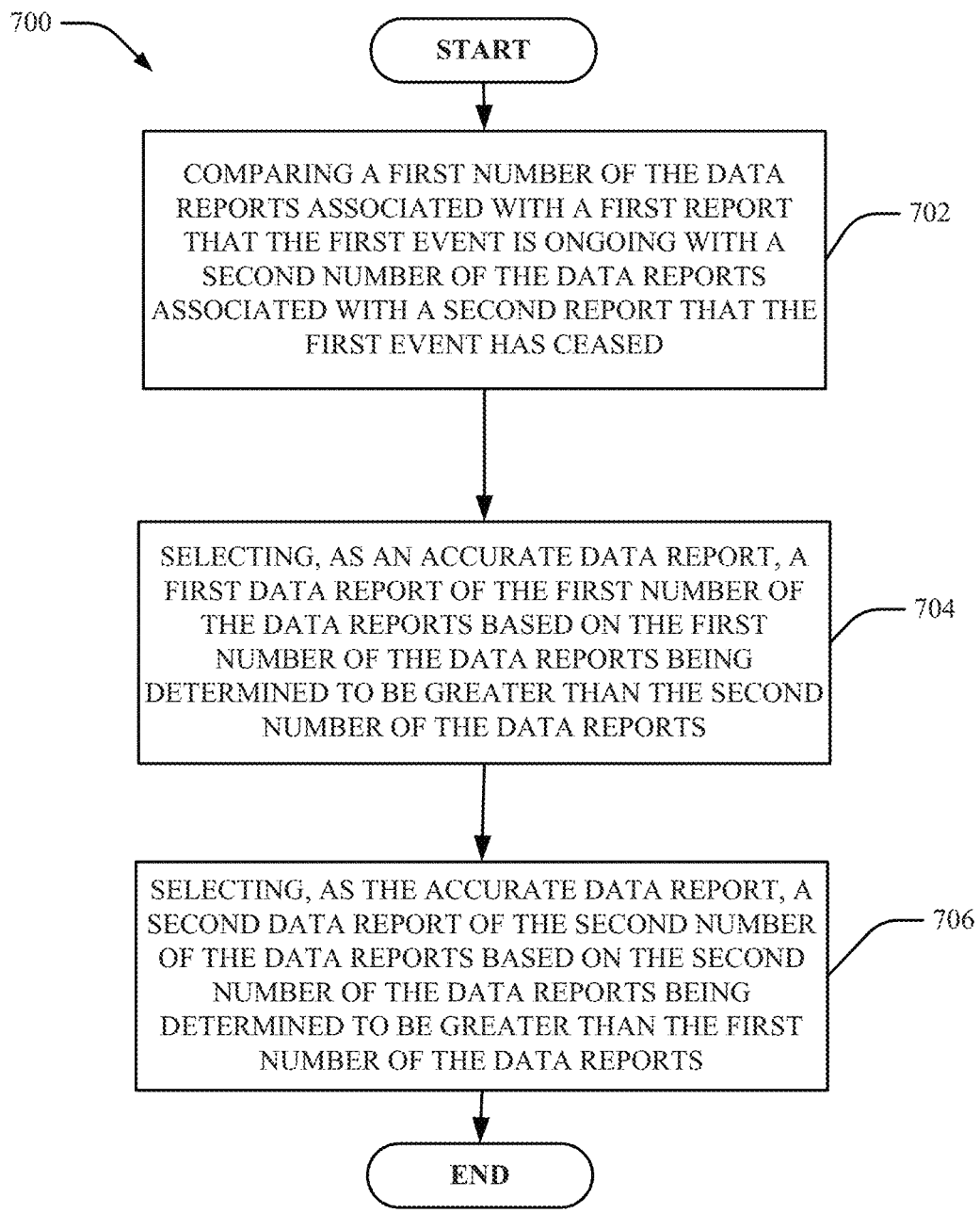

Turning now to FIG. 7, at 702, method 700 can include comparing a first number of the data reports associated with a first report that the event is ongoing with a second number of the data reports associated with a second report that the event has ceased.

At 704, method 700 can include selecting, as an accurate data report, a first data report of the first number of the data reports based on the first number of the data reports being determined to be greater than the second number of the data reports. At 706, method 700 can include selecting, as the accurate data report, a second data report of the second number of the data reports based on the second number being determined to be greater than the first number.

Figure 8:
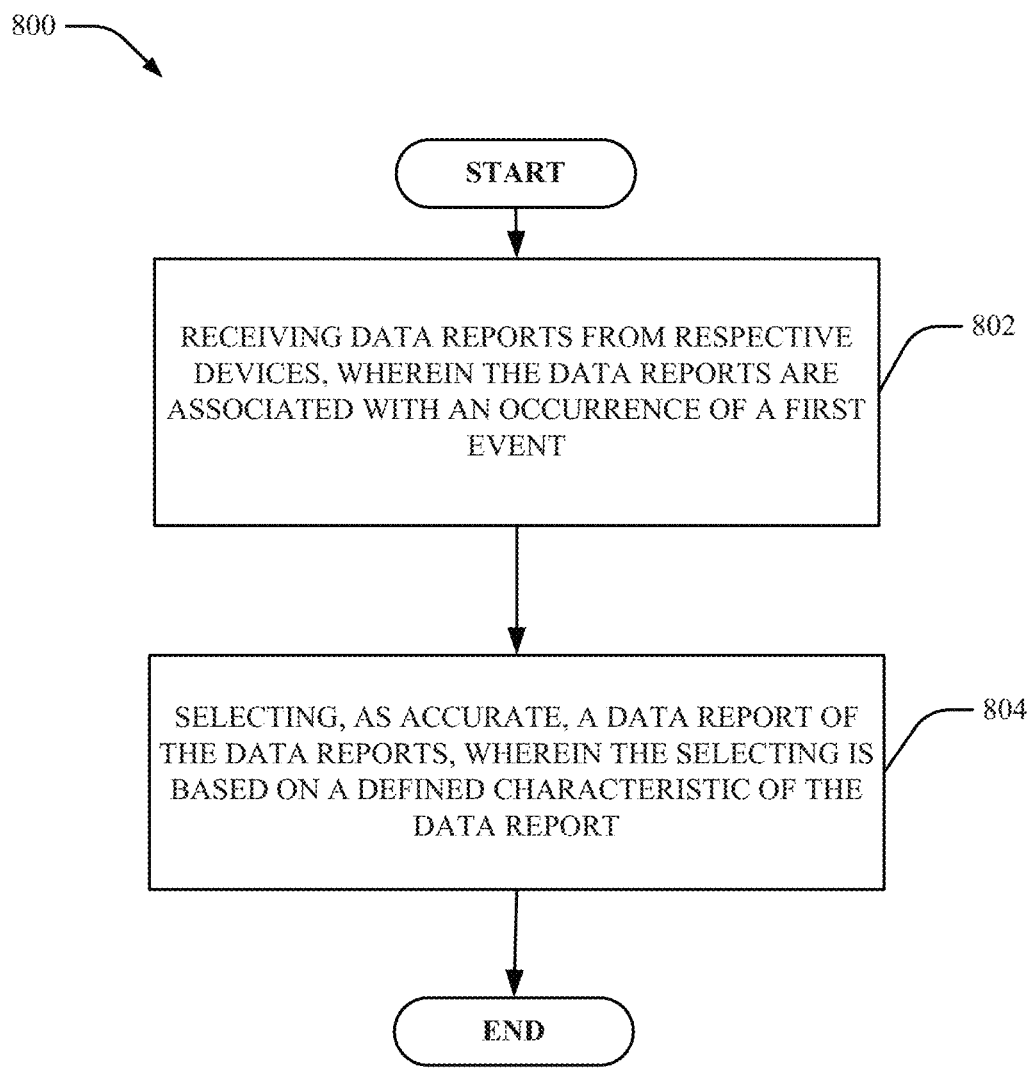

Turning to FIG. 8, at 802, method 800 can include receiving data reports from respective devices, wherein the data reports are associated with an occurrence of an event. At 804, method 800 can include selecting, as accurate, a data report of the data reports, wherein the selecting is based on a defined characteristic of the data report.

Figure 9:
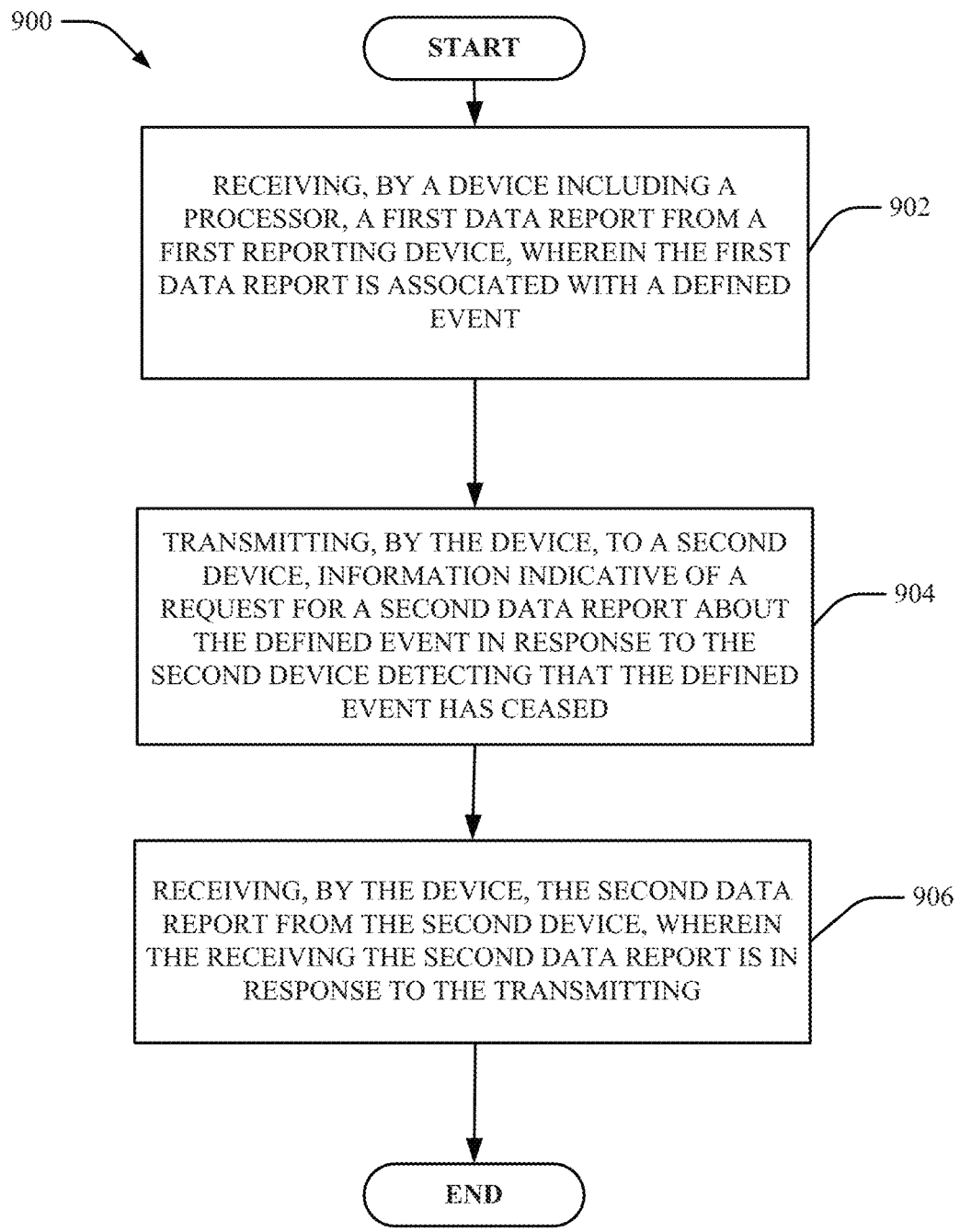

Turning now to FIG. 9, at 902, method 900 can include receiving, by a device, including a processor, a first data report from a first reporting device, wherein the first data report is associated with a defined event. At 904, method 900 can include transmitting, by the device, to a second device, information indicative of a request for a second data report about the defined event in response to the second device detecting that the defined event has ceased. At 906, method 900 can include receiving, by the device, the second data report from the second device, wherein the receiving the second data report is in response to the transmitting.

Figure 10:
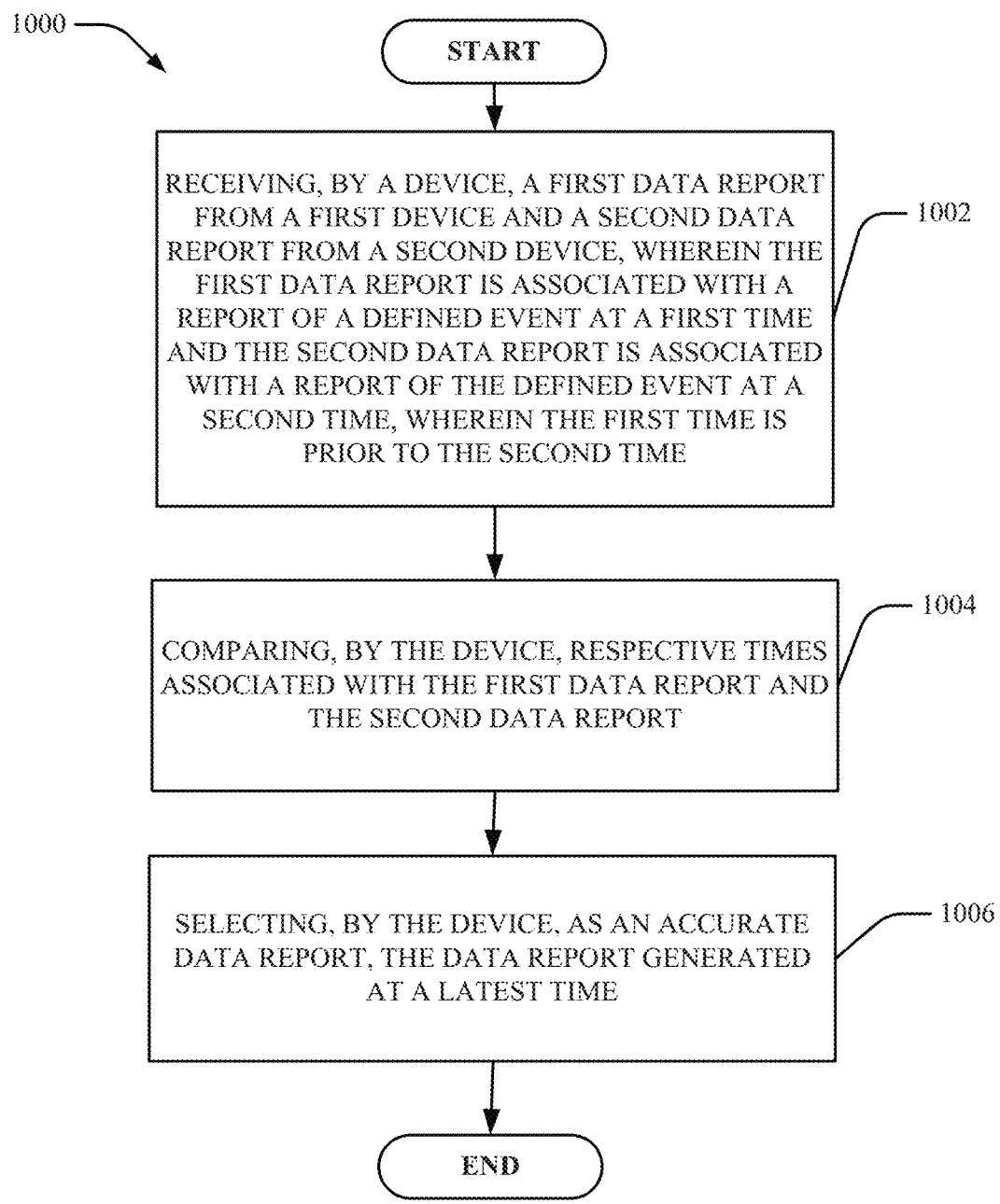

Turning now to FIG. 10, at 1002, method 1000 can include receiving, by a device, a first data report from a first device and a second data report from a second device, wherein the first data report is associated with a report of a defined event at a first time and the second data report is associated with a report of the defined event at a second time, wherein the first time is prior to the second time.

At 1004, method 1000 can include comparing, by the device, times associated with the first data report and the second data report. At 1006, method 1000 can include selecting, by the device, as an accurate data report, the data report generated at a latest time.

Figure 11:
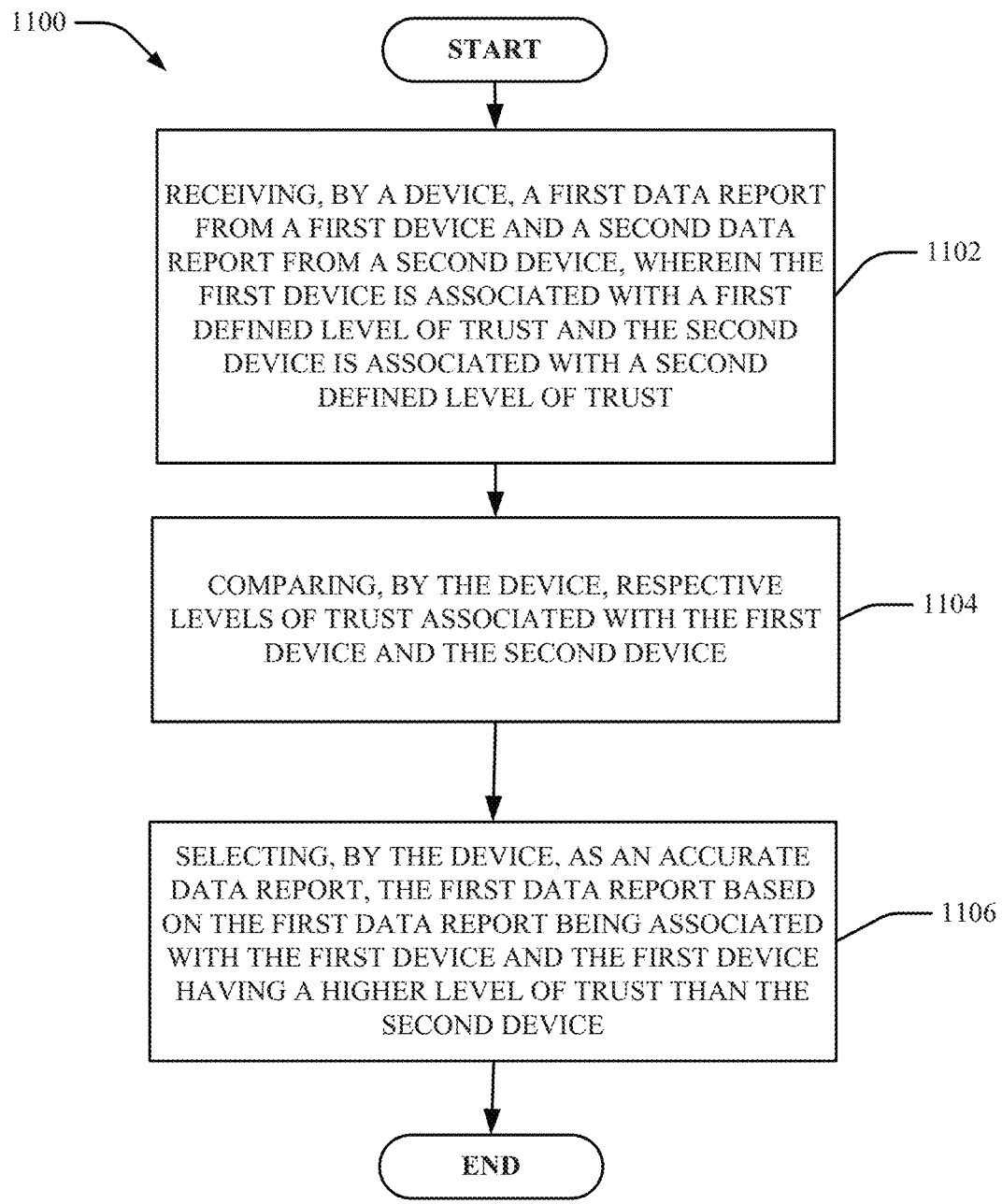

Turning now to FIG. 11, at 1102, method 1100 can include receiving, by a device, a first data report from a first device and a second data report from a second device, wherein the first device is associated with a first defined level of trust and the second device is associated with a second defined level of trust.

At 1104, method 1100 can include comparing, by the device, levels of trust associated with the first device and the second device. At 1106, method 1100 can include selecting, by the device, as an accurate data report the first data report based on the first data report being associated with the first device and the first device having a higher level of trust than the second device.

Figure 12:
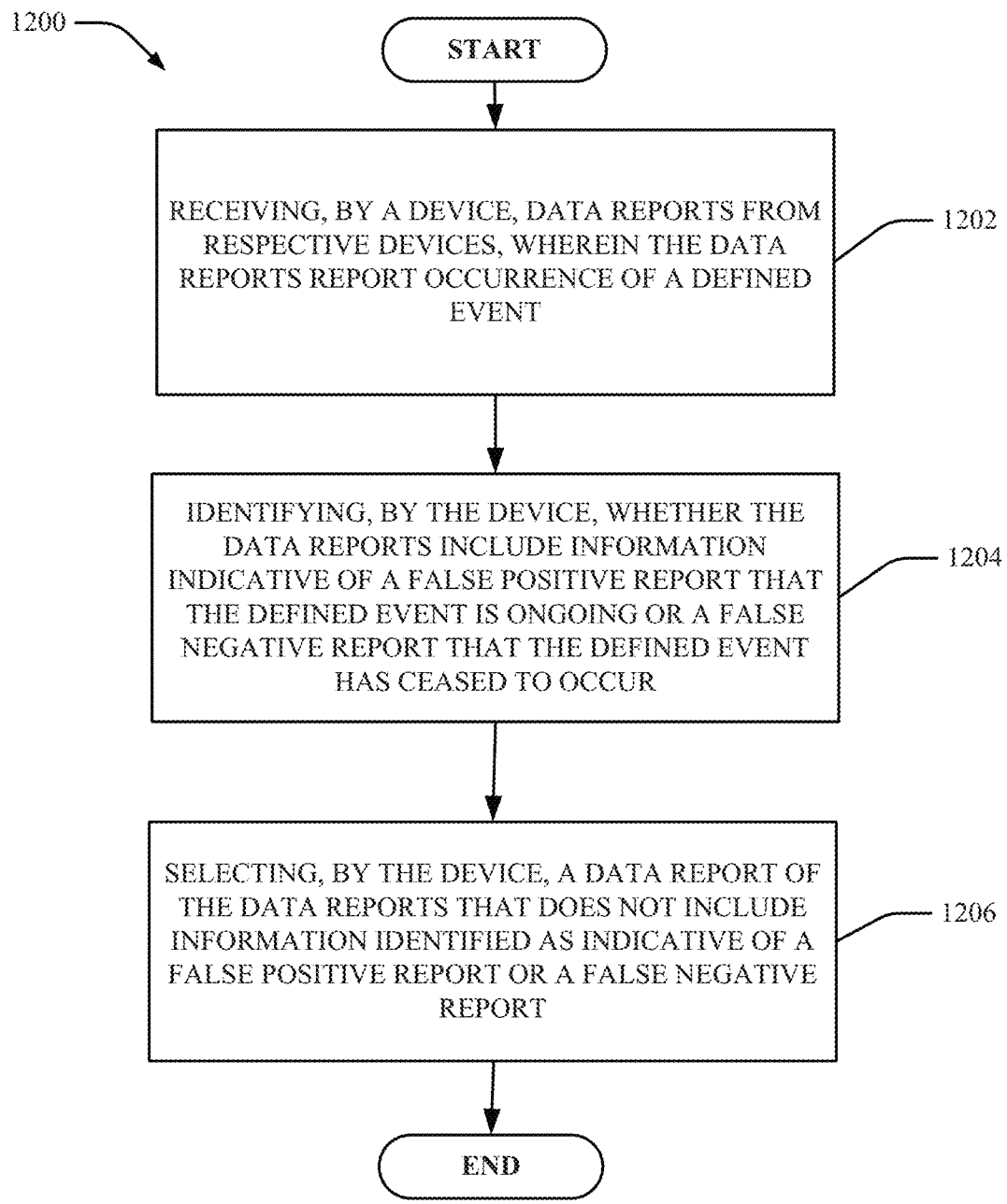

Turning now to FIG. 12, at 1202, method 1200 can include receiving, by a device, data reports from respective devices, wherein the data reports report occurrence of a defined event. At 1204, method 1200 can include identifying, by the device, whether the data reports include information indicative of a false positive report that the defined event is ongoing or a false negative report that the defined event has ceased to occur. At 1206, method 1200 can include selecting, by the device, a data report of the data reports that does not include information identified as indicative of a false positive report or a false negative report.

Figure 13:
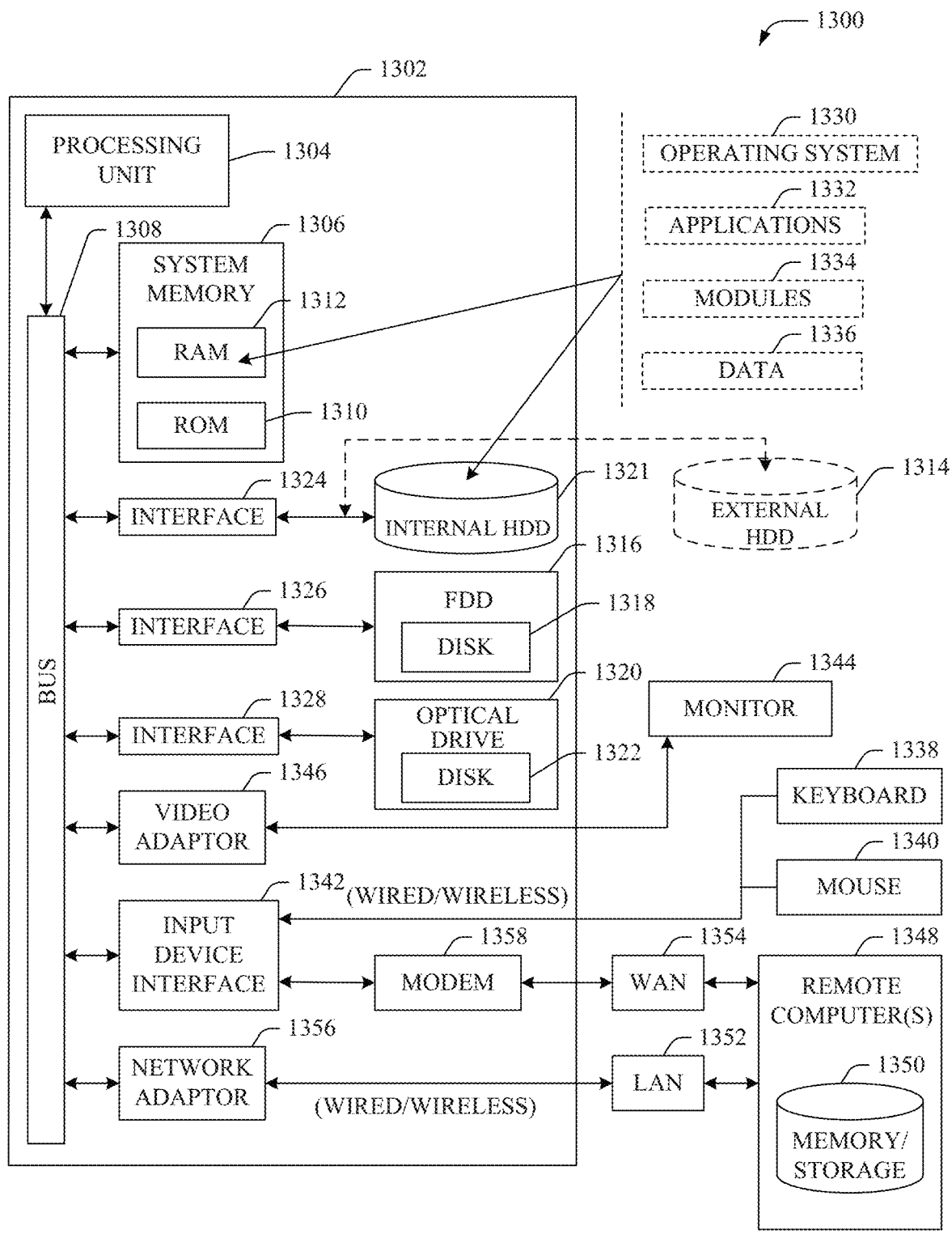
FIG. 13 illustrates a block diagram of a computer operable to facilitate determination of reliability of crowd sourced information in accordance with one or more embodiments described herein.

FIG. 13 illustrates a block diagram of a computer operable to facilitate determination of reliability of crowd sourced information in accordance with embodiments described herein. For example, in some embodiments, the computer can be or be included within device 102 and/or information reliability component 302.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1314, respectively. The interface 1324 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

A mobile device can enter commands and information into the computer 1302 through one or more wired/wireless input devices, e.g., a keyboard 1338 and a pointing device, such as a mouse 1340. Other input devices (not shown) can include a microphone, an infrared (IR) remote control, a joystick, a game pad, a stylus pen, touch screen or the like. These and other input devices are often connected to the processing unit 1304 through an input device interface 1342 that can be coupled to the system bus 1308, but can be connected by other interfaces, such as a parallel port, an IEEE 1394 serial port, a game port, a universal serial bus (USB) port, an IR interface, etc.

A monitor 1344 or other type of display device can be also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1352 through a wired and/or wireless communication network interface or adapter 1356. The adapter 1356 can facilitate wired or wireless communication to the LAN 1352, which can also include a wireless AP disposed thereon for communicating with the wireless adapter 1356.

When used in a WAN networking environment, the computer 1302 can include a modem 1358 or can be connected to a communications server on the WAN 1354 or has other means for establishing communications over the WAN 1354, such as by way of the Internet. The modem 1358, which can be internal or external and a wired or wireless device, can be connected to the system bus 1308 via the input device interface 1342. In a networked environment, program modules depicted relative to the computer 1302 or portions thereof, can be stored in the remote memory/storage device 1350. It will be appreciated that the network connections shown are example and other means of establishing a communications link between the computers can be used.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   transmitting, by first network equipment comprising a processor to emergency vehicle equipment assisting with an event, a request for information about the event, resulting in the emergency vehicle equipment generating a first data report of data reports;
   based on transmission of the request for information to the emergency vehicle equipment, receiving, by the first network equipment from the emergency vehicle equipment, the first data report, wherein the first data report is associated with an occurrence of the event;
   determining, by the first network equipment, first reliability data representing a reliability of a second data report of the data reports, wherein the second data report of the data reports is received from second network equipment other than the emergency vehicle equipment and the first network equipment;
   based on determining the first reliability data, determining, by the first network equipment, whether the event is continuing to occur;
   determining, by the first network equipment, second reliability data for a third data report of the data reports, wherein the third data report is received from third network equipment other than the emergency vehicle equipment, the second network equipment and the first network equipment, and wherein the second data report and the third data report are crowdsourced;
   based on an aggregation of the first data report, the second data report, and the third data report, determining, by the first network equipment, that the event is not continuing to occur;
   based on the determining indicating that the event is not continuing to occur, determining, by the first network equipment, that the first data report is a false positive report; and
   in response to the determining that the first data report is the false positive report, deleting, by the first network equipment, the first data report.

2. The method of claim 1, wherein the second network equipment comprises a vehicle, and wherein the second data report and the third data report are crowdsourced based on respective user input received via the second network equipment and third network equipment.

3. The method of claim 1, wherein the transmitting is performed via a first wireless channel, and wherein the receiving is performed via a second wireless channel.

4. The method of claim 1, wherein the first data report is received at a first time, and wherein the second data report is received at a second time different than the first time.

5. The method of claim 1, wherein the event comprises a weather condition.

6. The method of claim 1, wherein the event comprises a public celebratory activity.

7. The method of claim 1, wherein the third data report is based on crowd sourced data from a different vehicle.

8. The method of claim 1, wherein the second network equipment comprises a mobile phone.

9. The method of claim 1, wherein the determining the first reliability data comprises:
   determining a first location from which the first data report was received and a second location from which the second data report was received.

10. The method of claim 1, wherein the determining of the first reliability data comprises:
   determining a first time at which the first data report was received and a second time at which the second data report was received.

11. A system, comprising:
a processor; and
   a memory that stores executable instructions that, when executed by the processor, facilitate performance of operations, comprising:
   facilitating a transmission, to an emergency vehicle device assisting with an event, of a request for information about the event, resulting in the emergency vehicle device generating a first data report of data reports, wherein the first data report is associated with an occurrence of the event;
   based on the transmission of the request for the information to the emergency vehicle device, receiving, from the emergency vehicle device, the first data report;
   based on the first data report, determining first reliability data representing a reliability of a second data report of the data reports, wherein the second data report is received from a second device other than the emergency vehicle device;
   determining second reliability data for a third data report of the data reports, wherein the third data report is received from a third device other than the emergency vehicle device;
   based on an aggregating of the first data report, the second data report, and the third data report, determining that the event is not continuing to occur; and
   in response to a result of the determining being that the event is not continuing to occur, deleting the second data report based on the first data report being received from the emergency vehicle device.

12. The system of claim 11, wherein the event is determined to comprise a traffic-related event.

13. The system of claim 11, wherein the event is determined to comprise a security-related event.

14. The system of claim 11, wherein the event comprises a security event based on a security breach associated with a fire being determined to have occurred.

15. A non-transitory machine-readable storage medium, comprising executable instructions that, when executed by a processor of a first device, facilitate performance of operations, comprising: transmitting, via a first network channel to an emergency vehicle device assisting with an event, a request for information about the event, resulting in the emergency vehicle device generating a first data report of data reports, wherein the first data report is associated with an occurrence of the event;
   based on the request for the information being transmitted to the emergency vehicle device, receiving, from the emergency vehicle device via a second network channel, the first data report;
   based on the first data report, determining reliability data representative of a reliability of a second data report of the data reports, wherein the second data report is received from a second device other than the emergency vehicle device;
   determining second reliability data for a third data report of the data reports, wherein the third data report is received from a third device other than the emergency vehicle device;
   as part of aggregating the first data report, the second data report, and the third data report, determining that the event is not continuing to occur; and
   based on determining that the event is not continuing to occur, deleting the second data report of the data reports based on the first data report received from the emergency vehicle device and a determination that the second data report received from a vehicle other than the emergency vehicle device is a false positive report that the event is continuing to occur.

16. The non-transitory machine-readable storage medium of claim 15, wherein the first device comprises a connected car, and wherein the second data report and the third data report are crowdsourced.

17. The non-transitory machine-readable storage medium of claim 15, wherein the first device comprises a bicycle.

18. The non-transitory machine-readable storage medium of claim 15, wherein the request for the information about the event comprises a request for a type of the event.

19. The non-transitory machine-readable storage medium of claim 18, wherein the operations further comprise:
   determining whether the type of the event is associated with a location of the event.

20. The non-transitory machine-readable storage medium of claim 15, wherein the request for the information about the event comprises a request for a location of the event.

\* \* \* \* \*